United States Patent [19]
Skinner

[11] 4,299,263
[45] Nov. 10, 1981

[54] MECHANICAL ROUTER GUIDE
[76] Inventor: Charles D. Skinner, 5237 Nanette St., Bonita, Calif. 92002
[21] Appl. No.: 63,398
[22] Filed: Aug. 3, 1979
[51] Int. Cl.³ .............................................. B27C 5/10
[52] U.S. Cl. ........................... 144/144.5 R; 33/27 G; 144/134 D; 144/144 R
[58] Field of Search .......... 144/134 R, 134 A, 136 R, 144/309 A, 323, 2 R; 409/219, 220, 221, 224, 225, 226, 227, 182; 33/26, 27 R, 27 G

[56] References Cited
U.S. PATENT DOCUMENTS
931,552  8/1909  Ahlers .............................. 144/144.5

Primary Examiner—W. D. Bray
Attorney, Agent, or Firm—Henri J. A. Charmasson

[57] ABSTRACT

A fixture for positioning and guiding a router above the surface of a stationary workpiece, whereby the router is subject to a composite, three directional movement as it is moved above the workpiece. The fixture comprises an indexing table rotating on a base which is secured on top of or around the workpiece. The indexing table carries a template holding frame which can be slanted at an adjustable angle in relation to the workpiece in order to create designs of varying depth and width into the workpiece.

5 Claims, 5 Drawing Figures

MECHANICAL ROUTER GUIDE

BACKGROUND OF THE INVENTION

This invention relates to woodworking fixtures and more particularly to templates and stationary guides for hand-held power tools. Natural materials such as earth, rocks, wool, and in particular, wood, have become very popular in the arts and craft with both the professional and the master craftsmen. Decorative engraving on a wooden workpiece can be achieved with a hand-held drill or a router with the help of a guiding pattern. However, it is very difficult to create repetitive designs which remain symmetrical not only on the particular workpiece but also from one workpiece to another. It is also extremely difficult to repetitively and consistently create engraving designs of varying depth and width without using complex machinery such as laser beam devices.

SUMMARY OF THE INVENTION

The principal object of this invention is to provide a simple fixture for positioning and guiding a hand-held router around a stationary wooden workpiece in order to create engraving of variable depths and widths which may be consistently repeated within a particular workpiece or between various workpieces. Another object of this invention is to provide such a fixture whereby the depth and width of an engraved design can be accurately controlled and progressively varied. A further object of this invention is to provide a means for turning a simple hand-held router or hand drill into an elaborate wood carving machine. These and other objects are achieved by a indexing table rotating on a base affixed to a workpiece wherein the working table carries a template mounted in an adjustable slanted position in relation to the surface of the workpiece to be worked upon. The travel of the router bit is guided by the slanted template and the penetration of the bit into the workpiece varies according to the position of the router on the slanted template. Symmetrical engraving designs may be created in a circular pattern by rotation of the indexing table.

DESCRIPTION OF THE PREFERRED EMBODIMENT OF THE INVENTION

Figure 1:
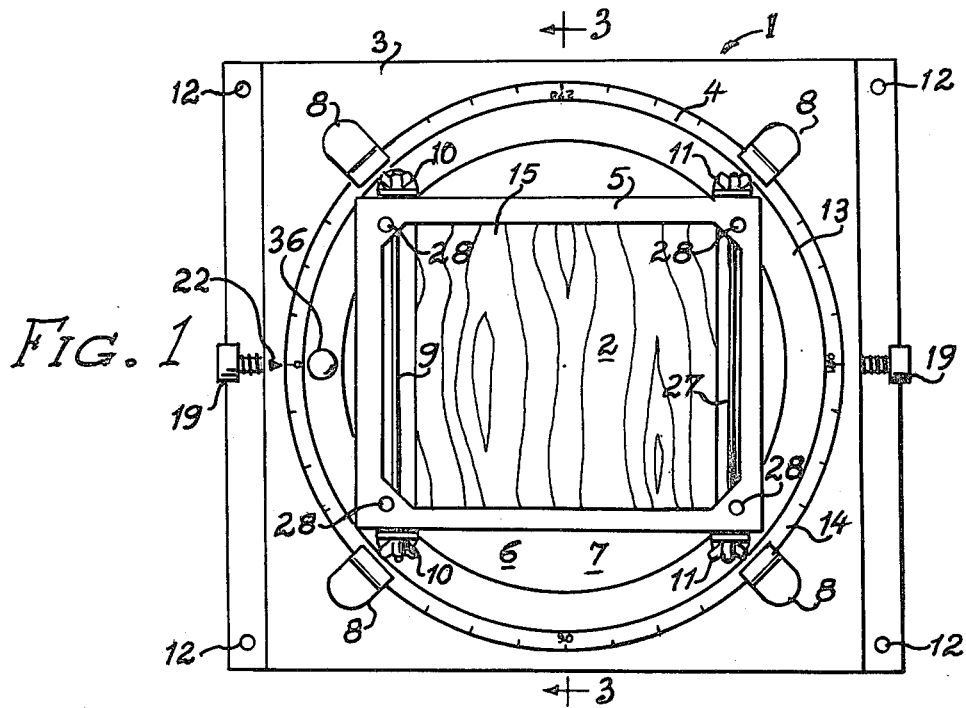
FIG. 1 is a top plan view of a mechanical router guiding fixture mounted above a wooden workpiece, without the template.
Figure 2:
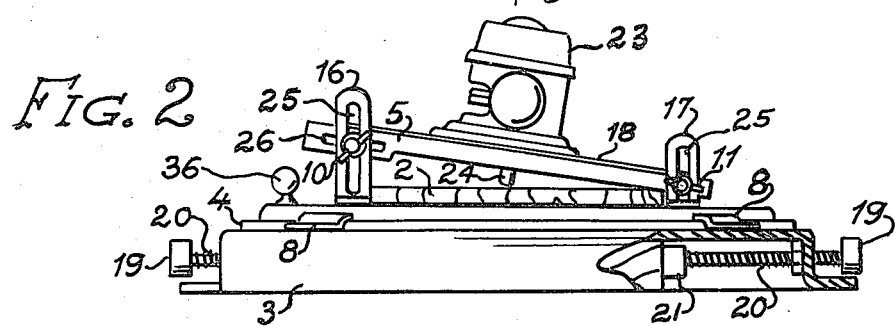
FIG. 2 is a front elevation thereof with a hand-held router positioned on the fixture and cut-away portion showing the workpiece clamping mechanism.
Figure 3:
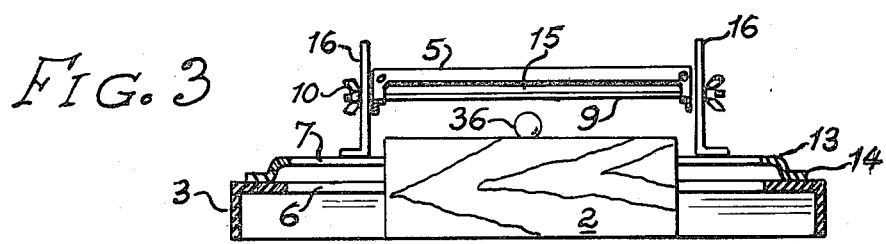
FIG. 3 is a sectional view taken along line 3—3 of FIG. 1.
Figure 4:
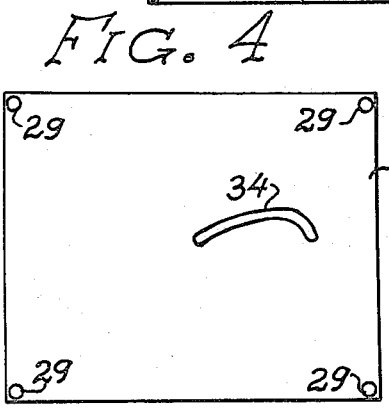
FIG. 4 is a top plan view of a guiding template.
Figure 5:
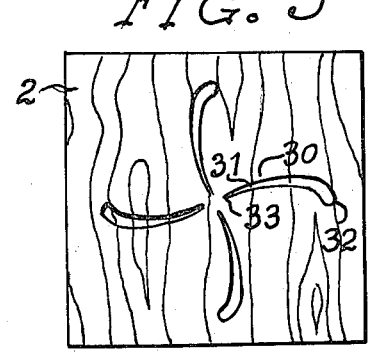
FIG. 5 is a top plan view of a workpiece showing a design created in accordance with the invention with the fixture illustrated in FIGS. 1 through 3 equipped with the template illustrated in FIG. 4.

Referring now to the drawing and according to the invention there is illustrated a router guiding fixture 1 particularly adapted for making engraved designs into a flat wooden surface of variable depth and width. The fixture 1 comprises a square stationary base 3 having a circular opening 6 in the center. The base 3 may be clamped on a large workpiece or secured thereupon by nails or screws inserted through holes 12 at each corner. The base can also be installed around the workpiece 2 as shown in the drawing. An annular, rotating, indexing table 4 is mounted on the base 3. The indexing table 4 has a lower, peripheral flange 14 resting on the base 3 and held in place by four brackets 8 welded to the base 3. The raised portion 13 of the indexing table has a large circular opening 7 in the center coaxial with the opening 6 in the base 3. A rectangular frame 5 designed to support a flat template 18 such as the one illustrated in FIG. 4 is positioned above the openings 6 and 7. The frame 5 is pivotally connected at one end to supporting posts 17 by means of rod 27 extending through slots 25 and secured by wing nuts 11. The opposite end of the frame 5 can be adjustably secured to posts 16 by means of wing nuts 10 which are screwed on threaded rod 9. A slot 25 in posts 16 and a slot 26 in each side of the frame 5 are both engaged by the rod 9 so that the frame 5 can be slanted at different angles in relation to the surface of the workpiece 2 to be engraved. A knob 36 mounted on the top surface of the indexing table 4 is used to change the angular position of the frame 5 in relation to the base 3 and the workpiece 2. A degree scale 21 engraved on the rim of the indexing table 4 may be used in correlation with the indexing pointer 22 on the base 3 to accurately set the angular position of the table 3. The template 18 is mounted on the frame 5 by inserting the stub 29 at each corner of the template into the corresponding holes 28 in the four corners of the frame 5. The workpiece 2 is positioned and held under the template 18 by clamping screws 20 located on the right and left side wall of the base 3. The clamping screws 20 are driven by means of knobs 19, and are terminated by wooden blocks 21 resting against the workpiece 2. The router 23 is placed on top of the template 18 with the bit 24 inserted in the slot 34 until the shank of the bit 24 engages the slot 34. The slot 34 corresponds to a simple decorative pattern especially selected for the sake of explanation. It can be understod that more elaborate patterns could be used to create more complex designs according to the principles of the invention. The distance between the template 18 and the workpiece 2 is adjusted so that when the router is positioned near the center of the fixture with the left bit at left end of slot 34 the lower tip of the bit comes in contact with the workpiece 2. As the router is turned on and pushed downward along the slot 34 toward the right side of the workpiece 2 the penetration of the bit 23 into the workpiece 2 increases progressively creating a design in the workpiece 2 which begins with a narrow and shallow groove 33 increasing progressively to a deeper and wider cut 32. The router is returned to the starting position, the indexing table is rotated 90° and the operation is repeated successively until the design illustrated in FIG. 5 is completed.

It can now be understood that the design 30 achieved by a single stroke of the router 23 guided by the template 18 is the result of a composite, three-directional movement imposed by first the shape of the slot 34 within the two-dimensional confines of the plane of the template 18 and the depth variation imposed by the slanting of the frame 5. The variations in the designs which may be created by means of this invention are limited only by the imagination and skill of the operator.

While I have described the preferred embodiment of the invention and suggested a mode of operation, other embodiments may be designed increasing the range of its application, without departing from the spirit of this invention and the scope of the appended claims.

What is claimed is:

1. An apparatus for positioning and guiding a hand-held tool about a workpiece which comprises:
   a flat guiding template supporting said tool; and
   means for placing the supporting surface of said template in a slanted position in relation to the face of the workpiece to be worked upon said means for placing comprising:
   a frame holding said template;
   a substructure stationarily positioned in relation to the workpiece and
   means for pivotally connecting the frame to the substructure around a first axis parallel to said face of the workpiece.

2. The structure claimed in claim 1 wherein said substructure comprises:
   a base stationarily positioned in relation to the workpiece;
   an indexing table rotatively mounted on said base along a second axis perpendicular to said first axis; and
   said means for pivotally connecting comprise:
   at least one post extending from said indexing table; and
   means for pivotally connecting the frame to said post along said first axis.

3. The structure claimed in claim 2 wherein said base comprises:
   a platform having a circular opening in its center; and
   said indexing table comprises an annular member coaxially mounted over said opening.

4. The structure claimed in claim 3 wherein said base comprises means for clamping the workpiece under the guiding template.

5. The structure claimed in claim 4 wherein said means for pivotally connecting the frame comprise:
   four posts extending from said annular member, each said post having a longitudinal slot;
   threaded rods extending perpendicularly to said posts from at least two sides of the frame, engaging said slots; and
   nuts on said rods for locking the rods to the posts.

* * * * *